United States Patent
DeBlasio

(10) Patent No.: US 6,558,089 B2
(45) Date of Patent: May 6, 2003

(54) EXTENDER ASSEMBLY FOR CORE DRILL

(76) Inventor: Michael J. DeBlasio, 409 King St., Littleton, MA (US) 01460

( * ) Notice: Subject to any disclaimer, the term of this patent is extended or adjusted under 35 U.S.C. 154(b) by 33 days.

(21) Appl. No.: 09/952,550

(22) Filed: Sep. 14, 2001

(65) Prior Publication Data

US 2003/0051923 A1 Mar. 20, 2003

(51) Int. Cl.$^7$ .......................... B23B 51/00; B23B 35/00; E21B 11/00
(52) U.S. Cl. ............... 408/239 A; 175/403; 408/239 R; 408/203; 408/204
(58) Field of Search ................................ 408/203, 204, 408/239 A, 239 R; 279/145; 175/20, 58, 320, 403, 405.1

(56) References Cited

U.S. PATENT DOCUMENTS

| | | | | |
|---|---|---|---|---|
| 1,225,209 A | * | 5/1917 | Beaulieu | 408/239 R |
| 3,865,502 A | * | 2/1975 | Hamann | 408/238 |
| 4,011,791 A | * | 3/1977 | Lanzenberger | 409/233 |
| 4,076,444 A | * | 2/1978 | Siebrecht | 408/239 A |
| 5,030,043 A | * | 7/1991 | Fischer et al. | 279/145 |
| 5,141,370 A | * | 8/1992 | Baumann | 409/232 |
| 5,516,243 A | * | 5/1996 | Laube | 408/239 R |
| 5,957,634 A | * | 9/1999 | Carpinetti | 408/239 A |
| 6,171,033 B1 | * | 1/2001 | Wrobel | 408/239 R |
| 6,179,530 B1 | * | 1/2001 | Retzbach et al. | 408/239 R |
| 2002/0122702 A1 | * | 9/2002 | DeBlasio | 408/239 R |

* cited by examiner

*Primary Examiner*—David Bagnell
*Assistant Examiner*—Brian Halford
(74) *Attorney, Agent, or Firm*—Pandiscio & Pandiscio

(57) ABSTRACT

A core drill extender apparatus comprises an extender tube that is adapted to make a screw connection to a driver, and a connector assembly releasably mounted in the front end of the tube for connecting the extender tube to a core drill. The connector assembly comprises a tapered mandrel having a threaded axial extension at its front end for making a screw connection to a core drill, and an expandable locking sleeve that surrounds and engages the outer surface of the mandrel. The sleeve is made so that moving it relative to the mandrel in the direction of increasing mandrel outer surface diameter will cause the sleeve to expand radially and into tight frictional engagement with the extender tube.

20 Claims, 4 Drawing Sheets

EXTENDER ASSEMBLY FOR CORE DRILL

FIELD OF THE INVENTION

This invention relates to core drills used in drilling holes in concrete, hard fired brick and the like, and more particularly to provision of means for extending the effective length of a core drill.

BACKGROUND OF THE INVENTION

The drilling of lengthy holes, e.g., holes 10–20 inches long, in structures or structural components made of concrete or other dense masonry materials is commonly accomplished with a core drill (also called "core drill bit"). A typical core drill comprises an elongate hollow tubular member, one end of which is adapted to be releasably secured to the rotatable output shaft of a portable driver which typically is electrically powered but which may also be powered by a compressed gas such as air. Affixed to the opposite end of the tubular member, usually by welding, is a tubular cutting head or bit that may comprise diamond or carbide particles embedded in a metal matrix. The core drill derives its name from the fact that as it drills into concrete or other dense material the interior of the drill fills with a solid core of the material that is being drilled. Typically water is injected into the core drill to facilitate the drilling process. When water is injected, the drilling process is identified as "wet coring".

A problem with using core drills is that different length drills are required if different length holes are to be drilled. For that reason, manufacturers sell core drills in a number of different lengths. However, core drills are expensive and have a limited useful life. Having a full complement of different length core drills is costly and, even then, the appropriate length drill may not be available, or it may be available but worn to the point of being effectively useless. In such case, a longer length drill, if available, may be used to perform the desired drilling operation. Otherwise, since a shorter length drill will not suffice, the drilling operation may need to be delayed pending availability of a drill of suitable length.

SUMMARY AND OBJECTS OF THE INVENTION

The primary object of this invention is to provide an improved means of extending the effective length of a core drill used for drilling holes in concrete and other dense masonry material.

Another object is to provide a novel apparatus for extending the effective length of a core drill of the type having a screw connector for connecting it to a driver.

Still another object of this invention is to provide an extender for a core drill that is designed to be disposed between and to make screw connections to a driver and a core drill.

A further object is to provide an apparatus for extending the effective length of a core drill that comprises an extender tube attachable to a driver and a connector assembly for attaching the extender tube to a core drill, the connector assembly comprising an expandable means for releasably locking the connector assembly to the extender tube.

The foregoing objects are achieved by providing an extender apparatus for a core drill that comprises an elongate extender tube having an open front end and a back end that is adapted to make a secure but releasable connection to an electrical or pneumatic driver, and a connector assembly releasably mounted in the front end of the extender tube. In a preferred embodiment of the invention, the connector assembly comprises a mandrel that has a center passageway, a threaded axial extension in the form of a hollow shaft is mounted in one end of the mandrel, and an expandable locking sleeve that surrounds the mandrel and cooperates therewith to lock the mandrel to the extender tube. The mandrel has a tapered outer surface whose diameter increases with increasing distance from the mandrel end having the threaded axial extension, and the sleeve is made so that moving it relative to the mandrel in the direction of increasing mandrel outer surface diameter will cause the sleeve to expand radially and into tight frictional engagement with the mandrel and the extender tube. The threaded axial extension is adapted to make a screw thread connection to a core drill having a threaded hole or connector at its back end, thereby making the extender tube an extension of the core drill so that the latter can drill a hole with a depth greater than the length of the core drill (of course, drilling is interrupted when the depth of the drilled hole is near the length of the core drill for the purpose of removing the core of particles produced by the drilling). After drilling has been completed, detachment of the extender apparatus is easily accomplished without use of special tools.

Other objects, features and advantages of the invention are described or rendered obvious by the following detailed description of a preferred embodiment of the invention which is to be considered together with the drawings identified below.

THE DRAWINGS

DETAILED DESCRIPTION OF THE INVENTION

Figure 1:
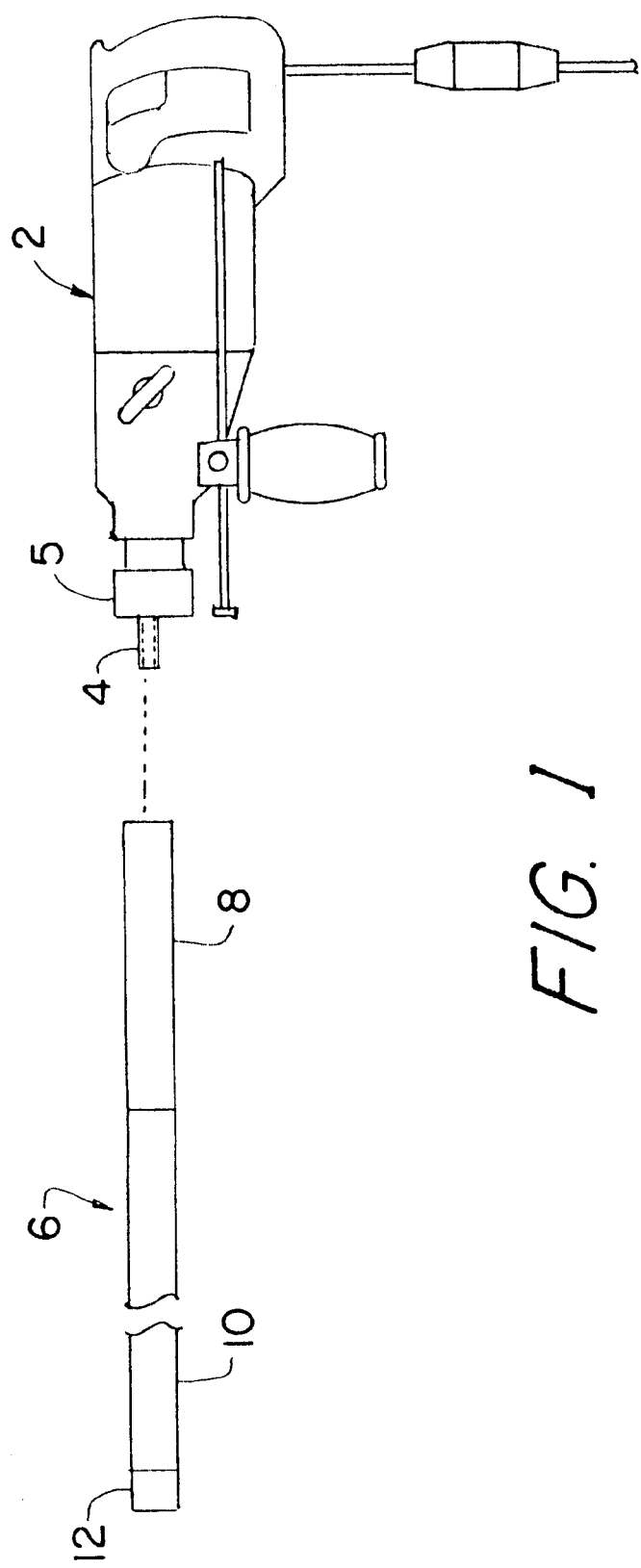
FIG. 1 is a side view in elevation of a conventional electrically-powered driver and a conventional core drill with an extender assembly attached thereto.

FIG. 1 shows a heavy duty electrically-powered driver 2, a threaded drive spindle 4 that is attached to and driven by the driver, a conventional core drill 6 for drilling holes in concrete or other masonry materials, and an extender apparatus 8 provided by this invention for extending the effective length of the core drill.

If desired, driver 2 may be replaced by a pneumatically-powered driver. The drive spindle 4 may, but need not, be a permanent part of the driver. For example, the driver may have a tool chuck 5 and the spindle 4 may be an accessory component that is releasably secured in the chuck so as to rotate therewith.

Core drill 6 comprises an elongate hollow cylindrical barrel 10 having a hollow cylindrical drill head or bit 12 affixed to its forward end. The drill head 12 may have the same outside diameter as barrel 10 or its o.d. may be slightly larger. Typically the drill head 12 comprises diamond or silicon carbide particles embedded in a strong metal matrix and is welded to barrel 10. The design and construction of the front end of drill 6, i.e., drill head 12, is not critical to this invention. Thus, for example, the front edge of the cutting head 12 may, but need not, be notched, as is common for core drills, and/or the core drill may have several shallow spiral grooves (not shown) in the outer surface of barrel 10 adjacent to drill head 12 to facilitate the drilling process.

Figure 2:
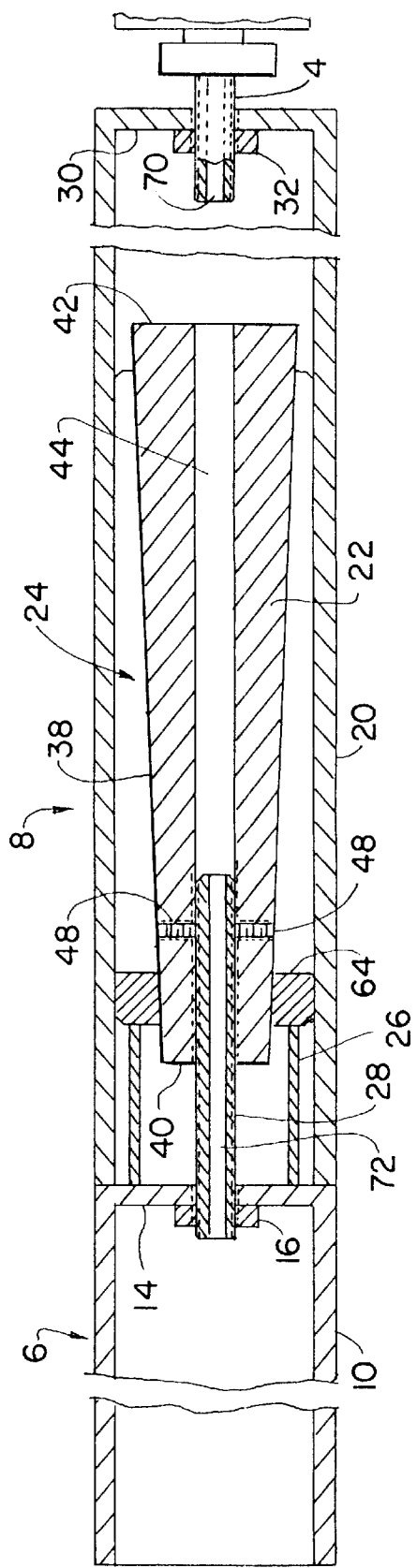
FIG. 2 is fragmentary longitudinal sectional view on an enlarged scale illustrating the extender apparatus with a preferred form of connector assembly attached to the driver and the core drill.
Figure 3:
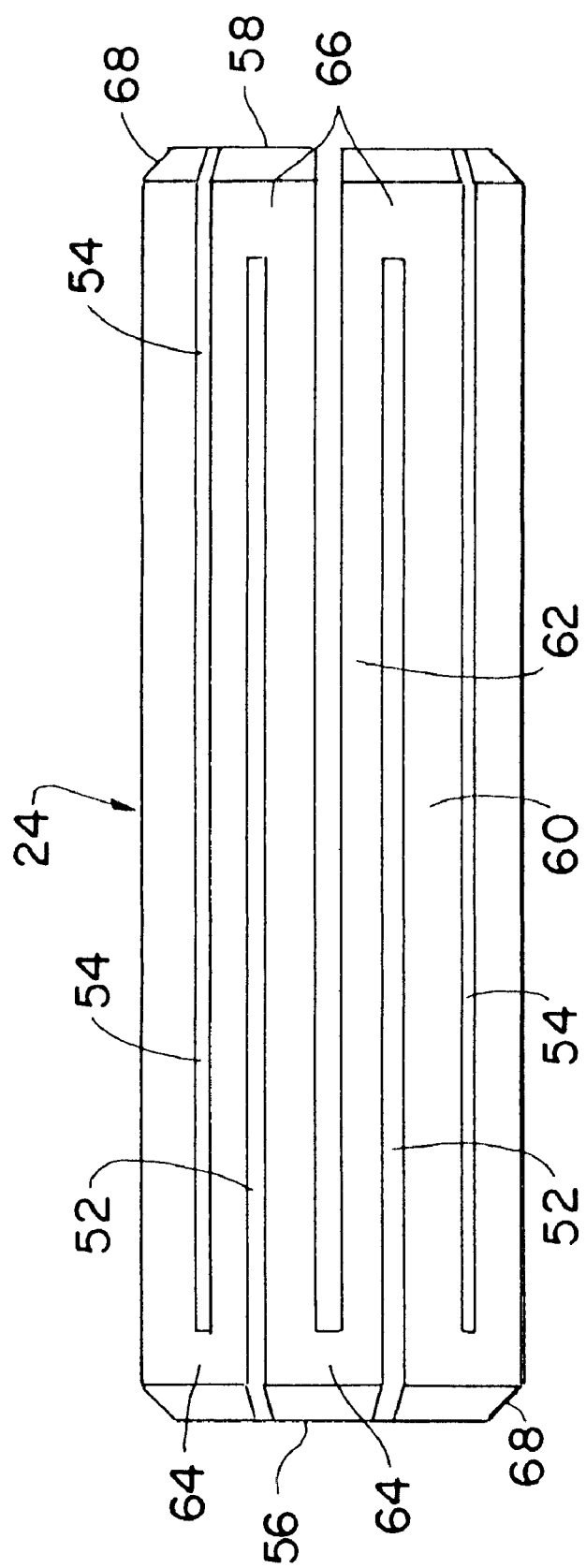
FIG. 3 is a side elevation of the radially expandable locking sleeve.
Figure 5:
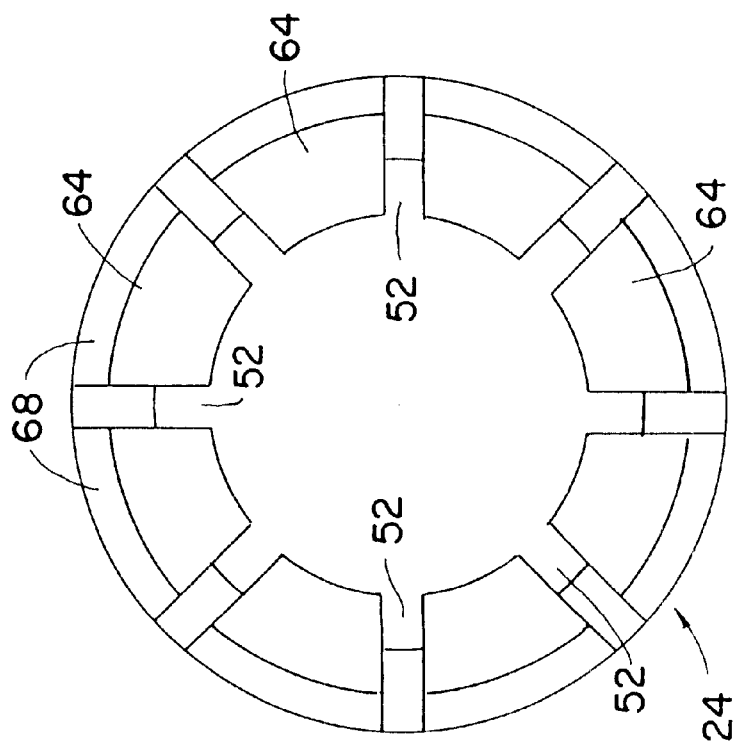
FIGS. 4 and 5 are back (right) and front (left) end elevation views respectively (as viewed in FIG. 2.) of the locking sleeve.
Figure 4:
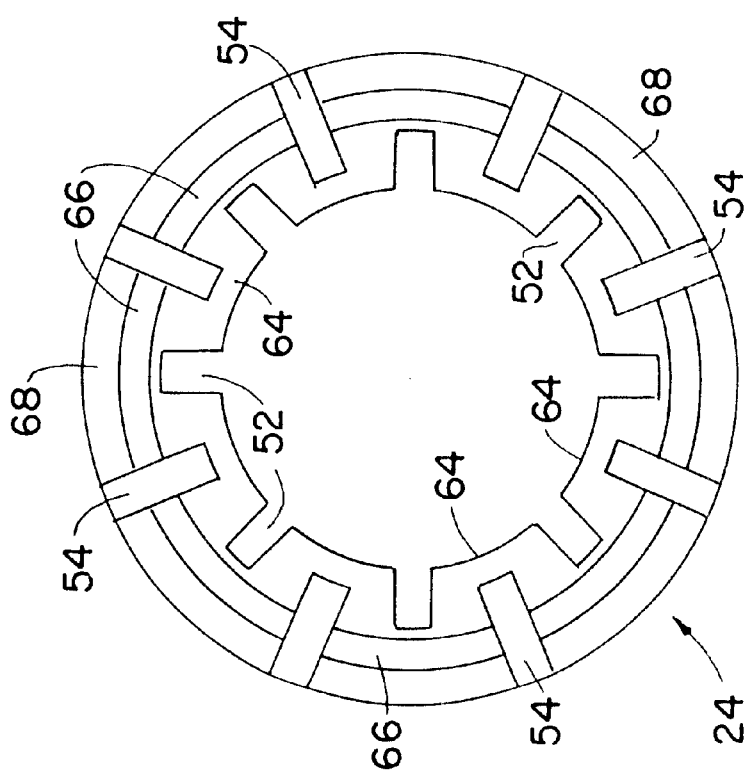

Referring now to FIG. 2, in the illustrated embodiment the core drill is of the type that is designed to make a screw connection with the drive spindle 4. The construction of the rear or back end of drill barrel 10 may take various forms for making a screw connection with a driver or the extender apparatus provided by this invention. By way of example but not limitation, in the illustrated embodiment the back end of barrel 10 is closed off by an end wall 14 which preferably is thick enough at its center for the purposes of the invention. By way of example but not limitation, the center of end wall 14 may be made thicker by welding thereto a member 16. End wall 14 and member 16 have aligned threaded holes for receiving and making a screw thread connection with the threaded drive spindle 4 or with an intermediate adapter (not shown) in the case where the threaded holes in end wall 14 and member 16 are larger or smaller than the output spindle of the driver or it is desired to extend the effective length of the output spindle. The threaded holes in end wall 14 and member 16 are coaxial with barrel 10.

The extender apparatus is designed to be attached at one end to the driver's output spindle 4 and at the other end to the core drill 6, both by a screw connection. For this purpose the extender apparatus 8 comprises an extender tube 20, a mandrel 22, a radially expandable locking sleeve 24, a spacer tube 26, and a shaft 28. Mandrel 22, sleeve 24 and shaft 28 constitute a connector assembly for locking extender tube 20 to the core drill.

Extender tube 20 is cylindrical and has an open front end and a back end that is closed off by an end wall 30 which preferably is made thick enough at its center for the purposes of the invention. By way of example but not limitation, the center of end wall 30 may be made thicker by welding thereto a member 32. End wall 30 and member 32 have aligned threaded holes for receiving and making a screw thread connection with the threaded drive spindle 4. The outer diameter of tube 20 is sized to match the outer diameter of the core drill barrel 10, with the result that the forward end surface of tube 20 can engage end wall 14 of the core drill. The threaded holes in end wall 30 and member 32 are coaxial with tube 20.

The mandrel 22 is sized so that it can be inserted into the front end of extender tube 20. Additionally the mandrel's length is shorter than that of tube 20. Mandrel 22 has a tapered outer surface 38 of circular cross-section. Preferably but not necessarily, its front and rear ends are terminated by flat end surfaces 40 and 42 as shown. Preferably, but not necessarily, the maximum diameter of the mandrel is between about 0.020 inch to about 0.080 inch less than the inner diameter of tube 20.

The combination of a tapered mandrel and an expandable locking sleeve is well known in the machine tool industry as a means for supporting and centering a work piece in a lathe. For the purposes of the preferred embodiment of this invention, the mandrel is provided with an axially-extending through bore 44. The front end of bore 44 is threaded to make a screw connection with shaft 28. The latter may be externally threaded over its full length as shown, but alternately it may be threaded for only a selected distance at its opposite ends. One or more radially-extending tapped holes are formed in the mandrel adjacent its forward end and set screws 48 are screwed into those holes to firmly and releasably secure shaft 28 to the mandrel. If desired, small depressions or blind holes may be made in the outer surface of shaft 28 to received the ends of set screws 48, whereby to prevent shaft 28 from rotating relative to the mandrel. Essentially when the shaft 28 and the mandrel are secured together by set screws 48, they form an integrated connector member for connecting extender tube 20 to the core drill.

Referring now to FIGS. 2–5, the radially expandable locking sleeve 24 surrounds the tapered outer surface 38 of the mandrel. Preferably the locking sleeve is made of metal and is formed with a plurality of slots 52 and 54 that extend lengthwise and intersect the front and back ends 56 and 58 respectively of the sleeve, leaving parallel alternately-occurring mutually spaced sections 60 and 62 that are connected by front and back end web sections 64 and 66 respectively. The opposite ends of sleeve 24 may, but need not, be beveled as shown at 68. This slotted configuration permits the sleeve to expand radially under an expanding force created as described hereinafter. This form of locking sleeve is well known in the machine tool industry.

Sleeve 24 is made so that in its as-formed state its outer surface has a constant diameter throughout its length, while its inner surface is tapered so that its diameter increases in the direction of its rearward (back) end 58. As a result the wall thickness of the sleeve varies, being thickest at it front end 56 and thinnest at its back end 58. Sleeve 24 has a length substantially less than that of the mandrel. Sleeve 24 is made so that in its unexpanded condition, i.e., in its as-formed state, its outer diameter is slightly smaller than the inside diameter of extender tube 20, preferably about 0.005 inch to about 0.015 inch smaller, so as to allow the locking sleeve to make a narrow sliding fit within the extender tube. Preferably the inner surface of sleeve 24 is tapered with the same slope, i.e., the same angle of taper, as the outer tapered surface of the mandrel. The maximum inner diameter of sleeve 24 is less than the maximum o.d. of mandrel outer surface 38 and the minimum inner diameter of sleeve 24 is greater than the minimum diameter of mandrel surface 38. The sleeve 24 and mandrel 22 are sized so that the sleeve can be slipped over the mandrel and moved a substantial distance away from the front end surface 40 of the mandrel (but short of the rear end of the mandrel) before its inner surface fully engages the outer surface of the mandrel. Consequently, further relative movement of the sleeve away from end surface 42 will result in the mandrel exerting an increasing radial expansion force on the sleeve. Preferably sleeve 24 has a relatively thin wall, preferably in the range of about 0.025 inch to about 0.040 inch at its front end and between about 0.030 inch to about 0.050 inch adjacent its back end, so as to facilitate its radial expansion by the mandrel when is moved lengthwise toward the mandrel back end 42.

The length of the mandrel may vary, but it is shorter than the extender tube with which it is used. Moreover, its length must be such that when it is inserted into and locked to extender tube 20 by locking sleeve 24, (a) its front end will be withdrawn within the extender tube and (b) its rear end will be spaced from the extender tube's end wall 30. Preferably and by way of example, when the mandrel is locked to the extender tube by sleeve 24, the front end of the mandrel is about 2–3 inches behind the rear end wall 14 of the core drill.

Spacer tube 26 is provided to assure that locking sleeve 24 will lock the mandrel to the extender tube. More specifically, it serves to assure relative movement of the locking sleeve and the mandrel so as to lock the core drill to the extender tube. Preferably spacer sleeve 26 has an outer diameter that is close to the inner diameter of tube 20. By way of example but not limitation, the outer diameter of spacer sleeve 26 may be about 0.005 inch to about 0.040 inch less than the inner diameter of the extender tube 20, so as to facilitate its insertion into the extender tube and so as to avoid any misalignment problem relative to the spacer tube. In FIG. 2, the gap between spacer sleeve 26 and the inner surface of extender tube 20 is exaggerated for ease of illustration and identity.

Spacer tube 26 has a length such when the mandrel and locking sleeve are inserted into extender tube with the sleeve making a loose fit on the mandrel, the spacer tube 26 will fit in the space between the front end of sleeve 24 and the front end of extender tube 28, with the front end of the spacer tube being substantially flush the front end surface of the extender tube, or else slight short of or projecting slight forward of that front end surface. This assures that spacer tube 26 can be engaged by the rear end wall 14 of the core drill when the latter is coupled to shaft 28, whereby as the core drill and mandrel are drawn closer together by continued screwing of the core drill on shaft 28, spacer tube 26 will restrain the locking sleeve. Consequently on further relative movement of the mandrel and the core drill toward each other, the locking sleeve 24 will be engaged by progressively larger diameter portions of mandrel surface 38, causing the sleeve to expand into tight engagement with the extender tube's inner surface while simultaneously gripping the mandrel, thereby producing a secure locking connection between the mandrel and extender tube 20.

It should be noted that a given mandrel and locking sleeve may be used for different length extender tubes 20 of the same diameter, with the length of spacer sleeves 26 being adjusted as required to achieve the desired locking action. Extender tube 20 preferably is made of a strong metal material, while spacer sleeve 26 may be made of metal or a reinforced plastic material.

Connection of the core drill to the driver via the extender assembly is straightforward and is explained with reference to the components shown in FIG. 2. The order of assembly may vary. It may commence with attaching extender tube 20 to the drive spindle 4. Alternatively, the core drill may be attached to the extender sleeve assembly before the extender tube is attached to the driver spindle. Preferably, the assembly commences with screwing the extender sleeve 20 onto drive spindle 4. In this connection, it should be noted that spindle 4 may have a peripheral flange as shown in. FIG. 2 that can act as a stop, in which event the extender sleeve 20 is screwed far enough onto spindle 4 to engage that flange. Then the connector assembly consisting of mandrel 22 and shaft 28, and locking sleeve 24 in a non-expanded state or expanded just enough to hug the mandrel but with its outer diameter still smaller than the inner diameter of the extender tube 20, are inserted into the front end of the extender tube. Then spacer tube 26 is inserted in front of the locking sleeve. Then the core drill is screwed onto the front end of shaft 28. As it does so, it draws the mandrel toward it. The tendency of the locking sleeve to move with the mandrel is frustrated by the intervening spacer tube 26 which is blocked by the end wall 14 of core drill 6, resulting in spacer tube 26 forcing locking sleeve 24 backward relative to the mandrel, which in turn results in a wedging action that forces the locking sleeve to expand into tight engagement with the inner surface of the extender tube, thereby locking the mandrel and the shaft 28 against rotation relative to the core drill.

The spacer tube should be strong enough to resist collapsing under the axial compression forces created when it is compressed between locking sleeve 24 and the core drill end wall 14. Preferably spacer tube 26 is made of steel. Engagement of the core drill end wall 14 with the front end surface of the extender tube 20 also serves to stabilize the core drill against radial movement relative to the drive spindle. Because of the locking action of the extender apparatus with the spindle and the core drill, the full torque of the driver is applied to the core drill by the extender apparatus.

Although the strength of the locking grip exerted by locking sleeve 24 on both the mandrel and the extender tube is great, it is an easy matter to effect removal of the core drill from the extender assembly and also to removal of the mandrel and locking sleeve from the extender tube. Removal of the core drill is simply a matter of unscrewing it from shaft 28. Removal of the mandrel and the locking sleeve from the extender tube is accomplished by holding the extender tube 20 fixed against movement and then impacting the front end of shaft 28 with a hammer or other tool so as to cause the mandrel to move toward the rear end of the extender tube far enough to allow the locking sleeve to contract out of locking engagement with the extender tube. Once the locking sleeve is loosened, it and the mandrel may be withdrawn from the extender tube.

To the extent described above, the illustrated apparatus is well suited for dry coring, i.e., drilling without use of water. The illustrated embodiment of the extender assembly provided by this invention also is adapted for wet core drilling. As practiced prior to the present invention, wet coring, i.e., wet core drilling, involved use of a driver with means at its output end that permits water to be injected into the core drill. Such means may take the form of a water swivel which is interposed between and connects the core drill with the output spindle or tool chuck (not shown) of a driver. Water swivels, as well as a variety of drivers having permanent water injection means, are available commercially from a number of companies, including the Hilti organization, a corporation having a place of business at 12330 E. 60th Street South, Tulsa, Okla. 74121 identified above. An example of a water swivel for attachment to a chuck ins Hilti's DD 100⅝" Water Swivel. Another form of water injection means is exemplified by the Model BHW 812 VV core drill driver sold by Porter-Cable Power Tools, a company having principal place of business at 4825 Hwy. North, Jackson, Tenn. 38305. The water swivel, or equivalent means water injection means, functions to rotatively connect the output spindle or chuck to the core drill, as well as permitting water to be injected into the core drill. With respect to the latter function, the housing of the water swivel or other injection means typically has an inlet port for connection to a pressurized water supply tank (also not shown), whereby on command water will flow into the housing and from there into the near end of the core drill during a drilling operation.

In the context of wet core drilling, it is to be understood that the spindle 4 (FIG. 2) would be (a) the output shaft of a separate water swivel (not shown) attached to the output spindle or chuck of a powered driver, or (b) the output shaft of a driver (not shown) having a built-in water injection means at its output end. In either case, spindle 4 has through bore 70 through which water is discharged by the water injection means into the interior of the extender tube 20. Additionally, the shaft 28 also has a through bore 72. As a consequence, the interior of extender tube 20, mandrel bore 44 and shaft bore 72 coact to provide a continuous passageway for passing water discharged from bore 70 of spindle 4 to the interior of core drill 6.

Of course, if the extender assembly is to be used for only dry core drilling, the driver need not be provided with water injection means, spindle 4 may be a solid member, and the axial through bore 44 in mandrel 22 may be omitted and replaced by a threaded blind hole in the front end of the mandrel, with the blind hole having a depth sufficient to accommodate enough of shaft 28 to assure adequate mandrel support for that shaft.

The invention is susceptible of a number of modifications. In this connection, it is to be appreciated that the design and construction of the drive spindle is not critical to and forms no part of the present invention, and the invention may be practiced using drivers with different drive spindles. Moreover, the invention may be practiced without using a screw connection between the driver and the extender tube. For example, the back end of the extender tube may be modified to provide it with an axially extending non-threaded connector member (not shown) that is adapted to mate with a quick release mechanism (also not shown) on the output end of the driver, e.g., a quick release chuck as embodied in various commercially available core drill drivers. More specifically by way of example, the chuck 5 may be a quick release device having one or more movable lock elements. (not shown) that interlock with grooves or slots in the back end of said non-threaded connector member, and actuating means (also not shown) for moving the lock elements into and/or out of locking relation with those groove or slots. By way of example, the actuating means of the quick release device may be a spring-biased axially-movable actuating ring, similar to the actuating ring of the connectors used for attaching air hoses to pneumatic components or flexible gas lines to gas supply tanks. The essential requirement is that the chuck and the spindle be adapted to releasably lock to one another in a torque drive connection so that the spindle will rotate with the chuck. Similarly drivers with diverse forms of water injection devices may be used in practicing the invention. A further possible modification is to modify the front end of the mandrel and the back end of the core drill to provide for coupling them to one another by a quick release or bayonet type connection in place of a screw connection. Another possible modification is to provide the mandrel with an integral front axial extension in place of the removable shaft 28, with that integral front axial extension of the mandrel being threaded or provided with other suitable means for connecting it to a core drill. It also is contemplated that the members 16 and 32 may be omitted and the center holes in end walls 14 and 30 may be adapted for screw connections by providing those hole with threaded bushings that are welded in place. Additionally it is believed that the invention is susceptible of a number of other modifications that are made obvious to persons skilled in the art by the foregoing specific description and the drawings.

The extender assembly hereinabove described and illustrated facilitates core drilling of lengthy holes at precise locations in concrete or other masonry structures. A further advantage is that the extender apparatus of the invention is rugged, easy to use, and may be made in various sizes. Other advantages will be obvious to persons skilled in the art.

What is claimed is:

1. The combination of a core drill for drilling an elongate hole in concrete or other dense masonry material and an extender apparatus for increasing the length of said core drill;

said core drill comprising an elongate hollow barrel having a front end with a cylindrical drilling head and a rear end with a connector means for connecting said core drill to a powered driver or other device;

said extender apparatus comprising an extender tube having an open front end and a rear end with a connector means for connecting said extender tube to a powered driver, an elongate mandrel positioned within said extender tube, said mandrel having opposite rear and front ends and a tapered outer surface with a diameter that decreases with increasing distance from said front end thereof, an axial extension at said front end of said mandrel having means for connecting said mandrel to said core drill connector means, and a locking sleeve surrounding and engaging said tapered outer surface of said mandrel, said locking sleeve being expandable radially and being made so that moving it relative to the mandrel in the direction of said rear end of said mandrel will cause it to expand radially, said mandrel being disposed in said extender tube at said front end thereof with said axial extension projecting out of said front end of said extender tube, said mandrel and said sleeve being positioned so that said sleeve is expanded into tight locking engagement with the inner surface of the extender tube and said outer surface of said mandrel, whereby said core drill is locked to said extender tube.

2. A combination according to claim 1 wherein said core drill connector means comprises a threaded hole.

3. A combination according to claim 1 wherein said axial extension is a shaft attached to said mandrel.

4. A combination according to claim 3 including means for releasably locking said shaft to said mandrel.

5. A combination according to claim 4 wherein said shaft extends into a hole in said mandrel and is attached to said mandrel by a screw connection.

6. A combination according to claim 3 wherein said shaft has an axial bore extending therethrough.

7. A combination according to claim 1 wherein said axial extension is hollow.

8. A combination according to claim 1 wherein said mandrel has an axial bore that extends from said front end to said rear end thereof.

9. A combination according to claim 1 further including a spacer tube disposed within said extender tube between said locking sleeve and said core drill.

10. A combination according to claim 9 wherein said spacer tube is engaged with said locking sleeve and said core drill.

11. A combination according to claim 1 wherein said connector means of said core drill comprises a threaded hole, and further wherein said axial extension is a shaft having a back end attached to said mandrel and a front end with an exterior screw thread, said front end of said shaft being screwed into said threaded hole so as to lock said core drill to said extender tube.

12. A combination according to claim 1 wherein said extender tube has an end wall at said rear end thereof, and said connector means of said extender tube is a center hole with a screw thread for use in attaching said extender tube to an output shaft of a powered driver.

13. An extender apparatus for increasing the depth of penetration of a core drill of the type comprising an elongate hollow barrel having a front end with a cylindrical drilling head and a rear end with a screw connector means for connecting said core drill to the output shaft of a powered drill driver, said extender apparatus comprising:

an extender tube having an open front end and a rear end with screw connector means for connecting said extender tube to the output shaft of a powered drill driver;

an elongate mandrel positioned with said extender tube, said mandrel having opposite rear and front ends and a tapered outer surface having a diameter that decreases with increasing distance from said rear end of said mandrel;

a shaft projecting axially from said front end of said mandrel, said shaft having a front end with an exterior screw thread;

a locking sleeve surrounding and engaging said tapered outer surface of said mandrel, said locking sleeve being expandable radially and being made so that moving it relative to the mandrel in the direction of said rear end of said mandrel will cause it to expand radially;

said mandrel and said sleeve being positionable in said extender tube so that (a) said sleeve may be expanded into tight locking engagement with the inner surface of the extender tube and said outer surface of said mandrel and (b) said shaft projects out of the forward end of said extender tube in position to make a screw thread connection to a core drill having a screw thread connector.

14. An extender apparatus according to claim 13 wherein said shaft is hollow.

15. An extender apparatus according to claim 13 wherein said mandrel has an axial bore that extends for the full length of said mandrel, and said shaft has an axial bore that communicates with the axial bore of said mandrel.

16. An extender apparatus according to claim 15 wherein said shaft is releasably attached to said mandrel.

17. An extender apparatus according to claim 16 wherein said extender tube has an end wall at said rear end thereof and a center hole in said end wall with a screw thread for use in attaching said extender tube to an output shaft of a powered drill driver.

18. An extender apparatus according to claim 13 further characterized in that said mandrel and locking sleeve can be released from engagement with said extender tube by applying an axial force on said mandrel in the direction of said rear end of said mandrel.

19. An extender apparatus for increasing the depth of penetration of a core drill of the type comprising an elongate hollow barrel having a front end with a cylindrical drilling head and a rear end with a connector means for connecting said core drill to the output shaft of a powered drill driver, said extender apparatus comprising an extender tube and a connector assembly for connecting said extender tube to a core drill;

said extender tube having an open front end and a rear end with connector means at said rear end for connecting said extender tube to a powered drill driver; and said connector assembly comprising an elongate mandrel that is sized to be insertable into said open front end of said extender tube, said mandrel having rear and front ends and an axial extension projecting forwardly away from said front end that is adapted to be coupled to a core drill, and a locking sleeve locking said mandrel to said extender tube, said locking sleeve being sized to surround said mandrel and to be insertable into said open front end of said extender tube, said locking sleeve being expandable radially, and said locking sleeve and said mandrel being arranged so that when movement of said sleeve on said mandrel in a selected axial direction will cause said sleeve to expand radially into tight locking engagement with the inner surface of the extender tube while remaining in tight locking engagement with the outer surface of said mandrel, whereby said mandrel is locked to said extender tube.

20. An extender apparatus according to claim 19 wherein said mandrel has a tapered outer surface having a diameter that decreases with increasing distance from said rear end of said mandrel, and said locking sleeve has an inner surface that is tapered so that substantially all of said inner surface will contact said outer surface of said mandrel.

* * * * *